US010395431B2

(12) United States Patent
Akselrod et al.

(10) Patent No.: US 10,395,431 B2
(45) Date of Patent: *Aug. 27, 2019

(54) OVERLAY FOR CAMERA FIELD OF VISION

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,549

(22) Filed: Dec. 8, 2017

(65) Prior Publication Data

US 2018/0101992 A1    Apr. 12, 2018

Related U.S. Application Data

(63) Continuation of application No. 14/929,467, filed on Nov. 2, 2015, now Pat. No. 9,928,658.

(51) Int. Cl.
  *G09G 5/00* (2006.01)
  *G06T 19/00* (2011.01)
  *G06T 19/20* (2011.01)

(52) U.S. Cl.
  CPC .......... *G06T 19/006* (2013.01); *G06T 19/20* (2013.01); *G06T 2219/2016* (2013.01)

(58) Field of Classification Search
  CPC .................................................. G06T 19/006
  See application file for complete search history.

(56) References Cited

U.S. PATENT DOCUMENTS

| 8,739,672 | B1 | 6/2014 | Kelly |
| 8,792,005 | B2 | 7/2014 | Huseth et al. |
| 2008/0071559 | A1 | 3/2008 | Arrasvuori |
| 2008/0154504 | A1 | 6/2008 | Hein et al. |
| 2012/0092328 | A1 | 4/2012 | Flaks et al. |

(Continued)

FOREIGN PATENT DOCUMENTS

EP        0550172 A1    7/1993

OTHER PUBLICATIONS

Yun et al., "Calibration Method for Large Field of View Camera Based on Infinite Homography", CNKI, Jul. 2012, Printed on: Aug. 8, 2015, 3 pages, <http://en.cnki.com.cn/Article_en/CJFDTOTAL-GXXB201207026.htm>.

(Continued)

*Primary Examiner* — Charles Tseng
(74) *Attorney, Agent, or Firm* — Isaac J. Gooshaw

(57) ABSTRACT

One or more computer processors generate an augmented reality overlay for camera field of vision based on a perspective of a display device. The one or more processors generate an overlay image that represents a field of view of an imaging device based at least on an orientation of the imaging device at a first location. The one or more processors generate a modified overlay image by modification of one or both of a size and an orientation of the overlay image based, at least in part, on differences between (i) a second location and an orientation of an image display device relative to (ii) the first location and the orientation of the imaging device. The one or more processors the modified overlay image using the image display device.

20 Claims, 5 Drawing Sheets

(56) References Cited

U.S. PATENT DOCUMENTS

| | | |
|---|---|---|
| 2012/0195574 A1 | 8/2012 | Wallace |
| 2013/0335577 A1 | 12/2013 | Chiu et al. |
| 2014/0078378 A1 | 3/2014 | Demers et al. |
| 2015/0055830 A1 | 2/2015 | Datta et al. |
| 2017/0124764 A1 | 5/2017 | Akselrod et al. |

OTHER PUBLICATIONS

"3D Video Capture with Kinect", YouTube, okreylos, Uploaded on Nov. 14, 2010, Printed on: Aug. 5, 2015, 5 pages, <https://www.youtube.com/watch?v=7QmwoO1-8A>.

"ASL Safety & Security—3D Site Control Software", Railway-technology.com, Printed on: Aug. 5, 2015, 1 page, <http://www.railway-technology.com/contractors/computer/asl-control/asl-control1.html>.

"Cameras That Can See Through Walls!", YouTube, FW: Thinking, Published on: Aug. 7, 2013, Printed on: Aug. 5, 2015, 5 pages, <https://www.youtube.com/watch?v=PLtzilM0epg>.

IBM Appendix P., "List of IBM Patents or Patent Applications to be Treated as Related", dated Dec. 8, 2017, 2 pages.

OVERLAY FOR CAMERA FIELD OF VISION

BACKGROUND OF THE INVENTION

The present invention relates generally to the field of photography, and more particularly to digital overlay of images.

Professional and non-professional photographers use cameras and other recording devices to capture media content. While most individuals are capable of capturing media content, there are challenges to doing it well. The photographer needs to have an understanding of lighting, composition, as well as an understanding of what image is actually being captured by their equipment.

Often what is captured by a photographer is not the intended lighting, composition, or content. However, the photographer often is unaware of this until they review the captured media content. By this point, it may be too late to capture the intended or desired content. For example, images from a sporting event were to show a certain amount of foreground in order to provide perspective in an image. However, given the fast pace of the sporting event, the photographer does not have the time to review the captured images to ensure that the desired amount of foreground is included in each shot.

SUMMARY

Embodiments of the present invention provide a method, system, and program product for generating an augmented reality overlay for camera field of vision based on a perspective of a display device. One or more computer processors generate an overlay image that represents a field of view of an imaging device based at least on an orientation of the imaging device at a first location. The one or more computer processors generate a modified overlay image by modification of one or both of a size and an orientation of the overlay image based, at least in part, on differences between (i) a second location and an orientation of an image display device relative to (ii) the first location and the orientation of the imaging device. The one or more computer processors display the modified overlay image using the image display device.

DETAILED DESCRIPTION

Embodiments of the present invention provide visual guides to indicate at least one of what content is being captured and one or more areas of interest during a media recording session. For example, embodiments of the present invention provide visual guides that are used by those involved in or are working near a field of view of a camera during a video or still photography shoot. In some embodiments, a three dimensional structure is displayed for users to show an area that includes the field of view of a camera. Embodiments of the present invention provide a media recording device that is configured to send image data to an overlay producing device. Embodiments of the present invention provide an overlay producing device that generates and displays one or more visual guides to indicate what content is or will be captured by the media recording device.

The present invention will now be described in detail with reference to the Figures.

Figure 1:
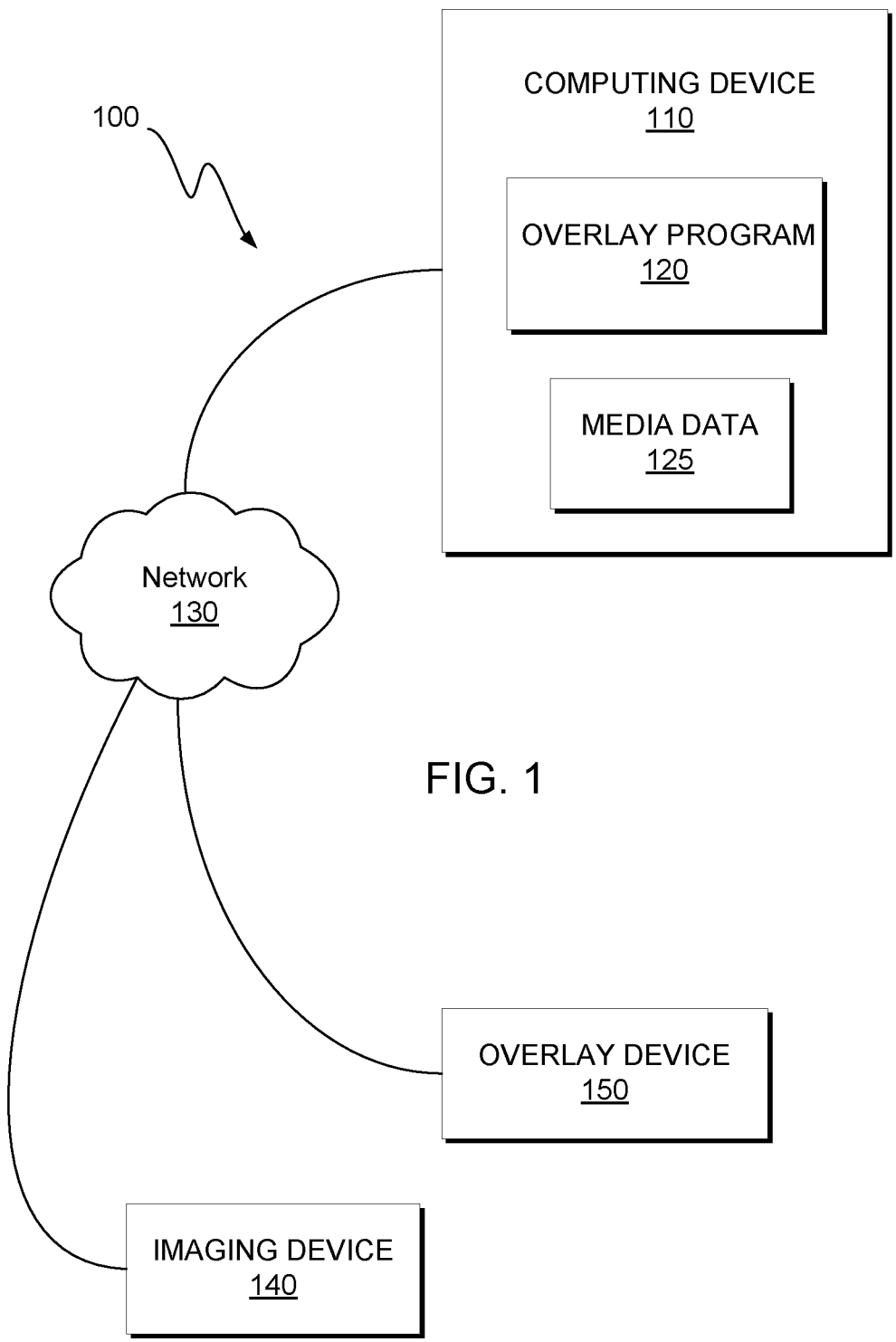
FIG. 1 is a functional block diagram illustrating an image-capturing environment, in accordance with an exemplary embodiment of the present invention.

FIG. 1 is a functional block diagram illustrating an image-capturing environment, generally designated 100, in accordance with one embodiment of the present invention. Image-capturing environment 100 includes computing device 110, imaging device 140, and overlay device 150 connected over network 130. Computing device 110 includes overlay program 120 and media data 125.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to overlay program 120 and media data 125, and is capable of executing overlay program 120. Computing device 110 can include internal and external hardware components, as depicted and described in further detail with respect to FIG. 3.

In this exemplary embodiment, overlay program 120 and media data 125 are stored on computing device 110. However, in other embodiments, overlay program 120 and media data 125 can be stored externally and accessed through a communication network, such as network 130. Network 130 can be, for example, a local area network (LAN), a wide area network (WAN) such as the Internet, or a combination of the two, and can include wired, wireless, fiber optic or any other connection known in the art. In general, network 130 can be any combination of connections and protocols that will support communications between computing device 110, overlay program 120 and media data 125, in accordance with a desired embodiment of the present invention.

In exemplary embodiments, imaging device 140 is a camera, or another like device, that captures one or both of images and video. Further, in some embodiments, imaging device 140 includes information gathering sensors (not shown). These sensors measure the position of imaging device 140 and its orientation using, for example, an indoor positioning system, a global positioning system (GPS), and orientation sensors. In general, imaging device 140 is configured to send data to overlay program 120 that indicates various settings of imaging device 140. For example, a focal setting indicating both width of view and depth of focus for the field of vision of imaging device 140. In some embodiments, imaging device 140 includes sensors that measure the depth of field in the field of view. This information, which is gathered by the sensors of imaging device 140, is sent to computing device 110, which is configured to receive the data feed produced by the sensors of imaging device 140. Computing device 110 saves at least a portion of this data feed as part of media data 125. In some embodiments, a video feed generated by imaging device 140 is included as part of the data feed. In some embodiments, imaging device 140 is configured to wirelessly communicate with computing device 110. In some embodiments, imaging device 140 can include internal and external hardware components, as depicted and described in further detail with respect to FIG. 3, such that imaging device 140 is configured to perform the various processes attributed to imaging device 140 as described herein. In some embodiments, overlay device 150 can include one or more software components such that overlay device 150 is configured, at least in part by that software, to perform the various processes attributed to overlay device 150 as described herein.

In exemplary embodiments, media data 125 includes data that describes the position and orientation of imaging device 140. In some embodiments, media data 125 also includes data regarding the subject matter being captured by imaging device 140. For example, media data 125 includes a known relationship between two objects as well as the size of those objects. In some embodiments, overlay program 120 uses such information to determine the field of vision for imaging device 140. For example, based on the known location and size of the two objects, overlay program 120 is able to determine, image analysis techniques, the distance between imaging device 140 and the objects as well as the orientation of imaging device 140 in relation to those objects. This information is, in some scenarios and embodiments, used by overlay program 120 to determine the field of view of imaging device 140.

In various embodiments, overlay program 120 is configured to determine a field of view of imaging device 140. Overlay program 120 generates an overlay image, for example an augmented reality overlay, that represents the field of view of the imaging device 140. Overlay program 120 determines a location of an image display device, for example overlay device 150, in respect to the field of view of imaging device 140. Overlay program 120 generates a modified overlay image by modifying of one or both of a size and an orientation of the overlay image based, at least in part, on the location of the image display device in respect to the field of view of imaging device 140. The modified overlay image is then displayed by the image display device in real-time.

In some embodiments, overlay program 120 is configured to determine a location of imaging device 140 based, at least in part, on data from at least one of an indoor positioning system, a global positioning system (GPS), and one or more orientation sensors. In some embodiments, overlay program 120 is configured to determine a measure of a depth of field of the field of view based, at least in part, on such data. In some scenarios and embodiments, the field of depth is based, at least in part, on a focal setting of imaging device 140. For example, imaging device 140 is set to be focused on objects that are twenty feet away. This information is sent from imaging device 140 to overlay program 120, which uses this data to determine, in part, a size of an element included in an overlay image. In this example, the "in-focus" region is represented as a three dimensional shape that is included in the overlay image.

In some embodiments, overlay program 120 is configured to generate the modified overlay image to include at least one of a) three dimensional shape with one or more edges that outline at least a portion of the field of view of imaging device 140, b) content that is viewable by imaging device 140, c) content as seen through an obstacle, d) a depth view of imaging device 140, and e) a visual identifier that indicates an object that is obstructed from the field of view of imaging device 140. For example, an object is obstructing the field of view of imaging device 140. As such, overlay program indicates the location of the object by adding a colored region to the overlay image that corresponds to one or both of the location of the object or a region of the field of view that is being obstructed by that object. In one embodiment, the region representing the obstructed field of view is indicated by a line in the overlay image that extends out from the imaging device 140 and intersects the obstructing object. In one embodiment, overlay program 120 adds a visual region to the overlay that extends out behind the obstructing object to indicate what subject matter is being obstructed, from the field of view of the imaging device, by the object. In one embodiment, one or more objects or portions thereof, which are obstructed, are indicated by overlay program 120 using visual elements added to the overlay. For example, in one scenario and embodiment, a portion of a vase is obstructed from the field of view of the imaging device, by a chair. As such, overlay program 120 adds an outlined region to a portion of the overlay that corresponds to the obstructed portion of the vase.

In some embodiments, overlay program 120 is configured to apply one or more types of image analysis to determine the position and orientation of imaging device 140 based on one or more of a known size, shape, orientation, and location of at least one object. In some such embodiments, overlay program 120 is configured to determine a location of imaging device 140 based, at least in part, on a comparison between a known orientation and known size of an object and an apparent orientation and apparent size of the object as included in media data 125. For example, the size, shape, orientation, and location of the Statue of Liberty is known. An image including the Statue of Liberty is analyzed by overlay program 120 to determine the apparent size of the statue, which is used to determine the distance between the statue and imaging device 140, which is an analysis and determination that is based on perspective. The known shape of the statue is then used by overlay program 120 to determine which way the statue is facing in the image. Based on this information overlay program 120 determines the orientation of imaging device 140 in relation to the statue. By combining these two pieces of information, overlay program 120 determines the overall location and orientation of imaging device 140. Wherein the location and orientation of imaging device 140 is a limiting factor, overlay program 120 is able to determine the field of view for imaging device 140 based on the overall location and orientation of imaging device 140.

In exemplary embodiments, overlay device 150 is configured to receive information from overlay program 120 and to generate an overlay image that indicates the field of view of imaging device 140. In general, in some embodiments, overlay device 150 is configured to display to a user an outline of a camera's field of view (similar to a three dimensional box), e.g., an outline of the field of view of imaging device 140. Some embodiments also show the depth view of imaging device 140. By providing the depth of view as part of the data feed, the augmented reality overlay can visually show which, if any, objects are being obstructed from the field of view of imaging device 140. For instance, if a person is standing near the front of the field of view of imaging device 140, and they are obstructing a product-placement object located behind them, then the augmented reality overlay generated by overlay program 120 shows this obstruction using overlay device 150 by marking all such obstructed objects with a different color, or another type of visual indicator. In one embodiment, such overlay approaches are used by overlay program 120 to configure one or more security devices, such as, but are not limited to, surveillance cameras, to minimize the number of or size of areas that are not being monitored by such security devices.

In some embodiments, overlay device 150 is a wearable device, i.e., is configured to be worn by a user, that provides a visual overlay of information from overlay program 120 such that the individual wearing overlay device 150 is shown this information overlaid on their own field of view. For example, in one embodiment, overlay device 150 is a pair of glasses that are configured to overlay the data regarding the field of view of imaging device 140. In some such embodiments, the overlay data produced by overlay program 120 is configured to take into account the location and orientation of overlay device 150. For example, in one such embodiment, as the user wearing overlay device 150 moves about a room, overlay program 120 receives location and orientation information from overlay device 150. Overlay program 120 uses this information to determine the size, shape, and orientation of the overlay to be displayed to the user wearing overlay device 150. As such, as the user moves about the room the overlay image is shifted such that the user is shown the field of view of imaging device 140 relative to their own position and orientation. In some embodiments, overlay device 150 can include internal and external hardware components, as depicted and described in further detail with respect to FIG. 3, such that overlay device 150 is configured to perform the various processes attributed to overlay device 150 as described herein. In some embodiments, overlay device 150 can include one or more software components such that overlay device 150 is configured, at least in part by that software, to perform the various processes attributed to overlay device 150 as described herein.

In some embodiments, overlay device 150 is configured to overlay other information such as, but is not limited to, an indication of what area is currently in focus for imaging device 140. In some embodiments, overlay device 150 is configured to overlay other information such as, for example, lighting data for a particular object of area in the field of view of imaging device 140. In one embodiment, such an overlay indicates not only the amount of light hitting the object but also the intensity of one or more sources of such light. In one such embodiment, overlay program 120 is configured to advise changes to such lighting if the lighting exceeds a threshold. For example, based on the field of view of imaging device 140 and the determined intensity of and source of light, overlay program 120 determines that the field of view of imaging device 140 is likely to experience an amount of glare, i.e., reflected light, from one or more objects in the field of vision. As a result, overlay program 120 indicates, using an overlay via overlay device 150, that a particular lighting device requires adjustment. In some embodiments, overlay program 120 includes specific information, i.e., recommendations, such as, for example, where to move such a light source and the lighting intensity that the light source is to be adjusted to.

Figure 2:
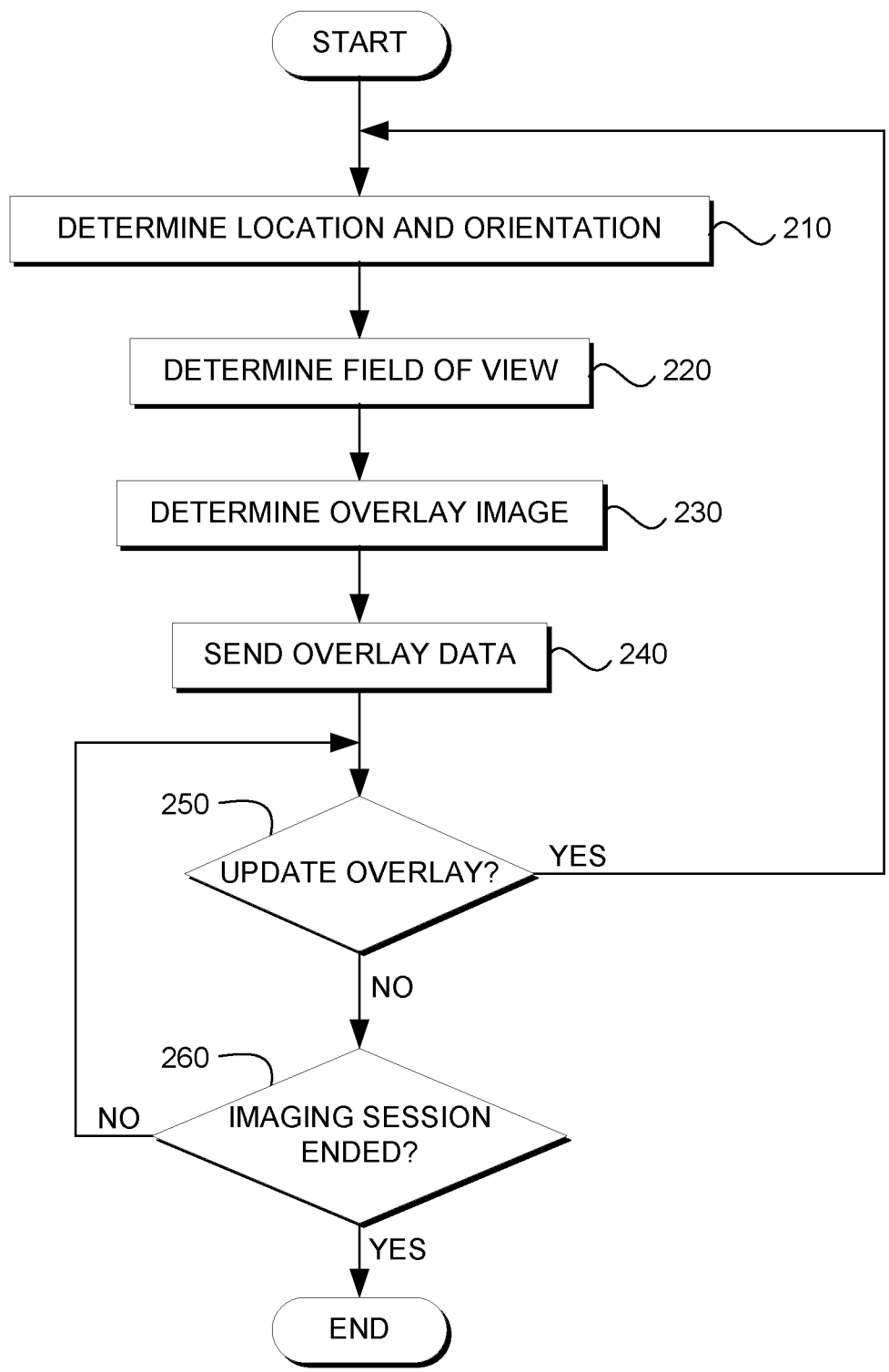
FIG. 2 illustrates operational processes of an overlay program, executing on a computing device within the environment of FIG. 1, in accordance with an exemplary embodiment of the present invention.

FIG. 2 illustrates operational processes of overlay program 120, executing on computing device 110 within the environment of FIG. 1, in accordance with an exemplary embodiment of the present invention.

In process 210, overlay program 120 determines the location and orientation of both imaging device 140 and overlay device 150. In general, information sent by imaging device 140 (including position, field of view, depth of view) is refreshed on a continual basis to handle the case where imaging device 140 keeps moving and\or the scene being recorded keeps changing. In one embodiment, both imaging device 140 and overlay device 150 each include one or more sensors configured to generate data indicating the respective location and orientation of both imaging device 140 and overlay device 150. In one embodiment, overlay program 120 receives images captured by both imaging device 140 and overlay device 150. In such examples, overlay device 150 also includes an image capturing device that captures the field of view of a user wearing overlay device 150. Overlay program 120 applies image analysis techniques to determine the location and orientation of both imaging device 140 and overlay device 150. For example, overlay program 120 applies image analysis techniques to compare and identify the difference in perspective between an image captured by imaging device 140 and an image captured by overlay device 150. In this example, both images include a common object. In this example a vase with an image painted on its surface. Media data 125 includes a size of the vase. Using this information overlay program 120 determines, based on the apparent size of the vase in the respective images, the respective distances of both imaging device 140 and overlay device 150 to the vase. Then, using another form of image analysis and the image painted on the surface of the vase, overlay program 120 determines the orientation of imaging device 140 and overlay device 150 relative to the vase as well as each other.

In process 220, overlay program 120 determines the field of view of both imaging device 140 and overlay device 150. Similar to process 210, overlay program 120 applies image analysis techniques to images captured by both imaging device 140 and overlay device 150 to determine the field of view of both imaging device 140 and overlay device 150. Note that the field of view is determined, in part, based on the location and orientation of both imaging device 140 and overlay device 150. As such, the respective fields of view each include a location and orientation aspect.

Figure 4:
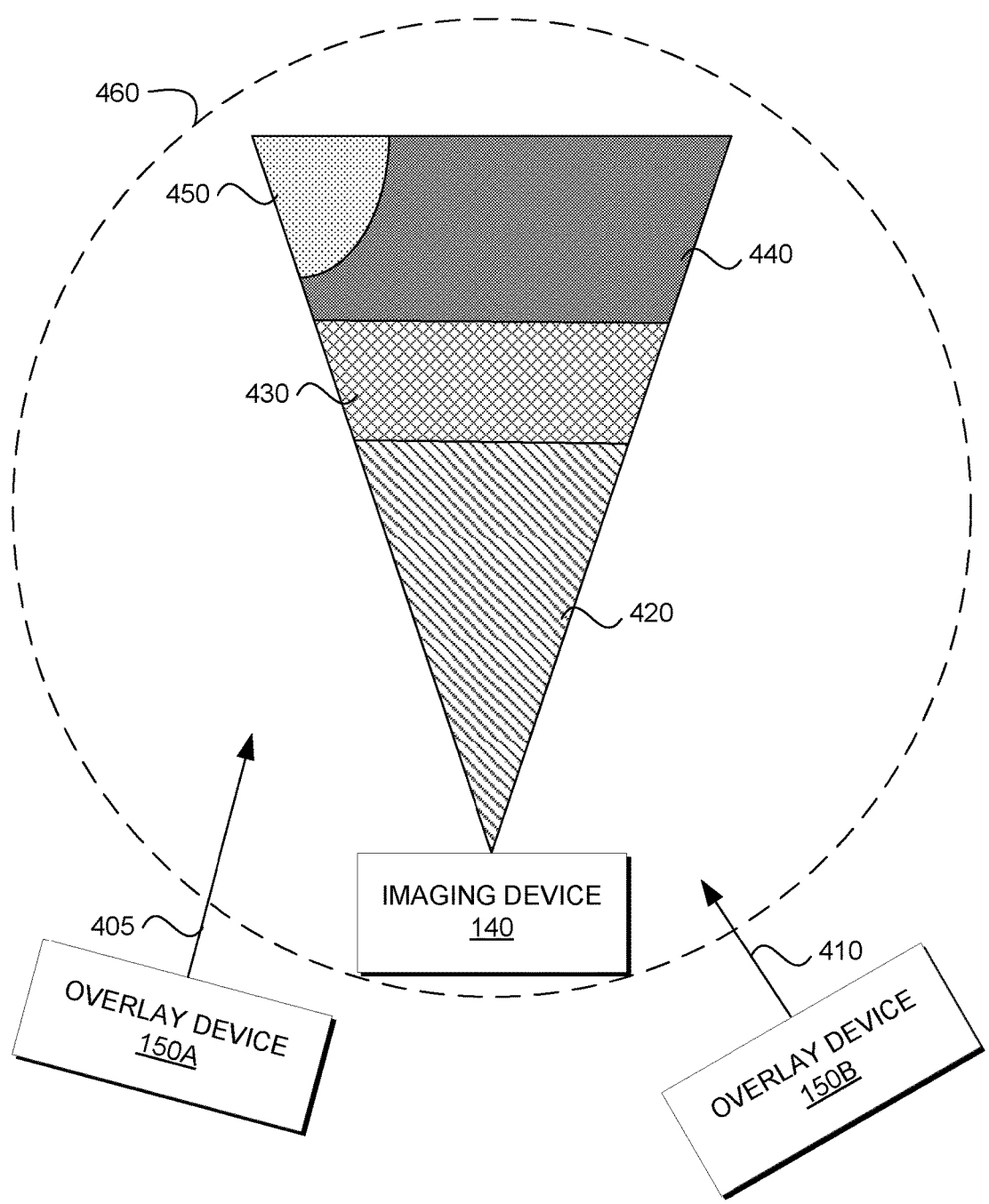
FIG. 4 illustrates top down view of an overlay as viewed from the perspectives of two different overlay devices, in accordance with an exemplary embodiment of the present invention.

In process 230, using the location and orientation data generated in process 210 and the field of view data generated in process 220, overlay program 120 determines the overlay image that represents the field of view of imaging device 140 as seen from the perspective of overlay device 150. The overlay image includes size, shape, and orientation aspects based on the information generated in processes 210 and 220. As part of this overlay image, in this embodiment, overlay program 120 determines a point of focus for imaging device 140. An area of focus, which includes the point of focus, is indicated in the overlay using a three dimensional shape included within another three dimensional shape that represents the field of view of imaging device 140. An example of such an overlay is shown in FIG. 4. In other embodiments, one or both of the field of view and focus of imaging device 140 can be represented using a variety of overlay techniques. For example, a variety of colors can be used to distinguish various overlay information. Such information can represent a variety of imaging properties such as lighting, distance to imaging device 140 etc. One skilled in the art recognizes that such an overlay approach can be modified to convey a variety of types of information. For example, such an overlay can be configured to convey a boundary to a number of individuals who are present and each have their own respective overlay device 150. Such a boundary may convey to the user that they are not allowed to pass beyond that boundary. In another example, an individual, wearing an overlay device 150, who is in the field of view of imaging device 140 is shown an overlay that indicates an area in which they are to remain, such that imaging device 140 captures one or both of specific image composition, such as lighting and media content.

In process 240, overlay program 120 sends the overlay data to overlay device 150. Overlay device 150 displays the overlay image to the user as an overlay on their field of view.

In determination process 250, overlay program 120 determines whether to update the overlay. In general, overlay program 120 determines whether to update the overlay based on whether one or more criterion have been met. In other words, overlay program 120 determines whether a type of criterion has been met that dictates that the overlay image is to be updated. As such, in general, overlay images and changes in those images are reflected in real-time by overlay program 120. In one embodiment, overlay program 120 is configured to update the overlay periodically, e.g., once every second. In this case, the criterion determines whether or not the predetermined time interval between updates has been met. In some embodiments, overlay program 120 determines whether to update the overlay based, in part, on a threshold for refreshing the overlay. In one such embodiment, a threshold being met is another type of criterion. In one embodiment, overlay program 120 determines whether to update the overlay based, in part, on whether the scene has changed, which is another type of criterion. In another example, in one embodiment, overlay program 120 determines whether to update the overlay based, in part, on whether the user has moved, which, for example, can be determined based on a change in the location or orientation of one or both of overlay device 150 and imaging device 140. In one such embodiment, overlay program 120 determines whether the user has moved if the location or orientation changes such that the change exceeds one or more thresholds. If overlay program 120 determines that the overlay is to be updated (determination process 250, YES branch), then overlay program 120 returns to process 210. If overlay program 120 determines that the overlay is not to be updated (determination process 250, NO branch), then overlay program 120 proceeds to determination process 260.

In determination process 260, overlay program 120 determines whether the imaging session has ended. In some embodiments, overlay program 120 makes such a determination based on received user input. In some embodiments, overlay program 120 makes such a determination based on information received from one or both of imaging device 140 and overlay device 150. If overlay program 120 determines that the imaging session has ended (determination process 260, YES branch), then overlay program 120 ends. If overlay program 120 determines that the imaging session has not ended (determination process 260, NO branch), then overlay program 120 returns to determination process 250.

Figure 3:
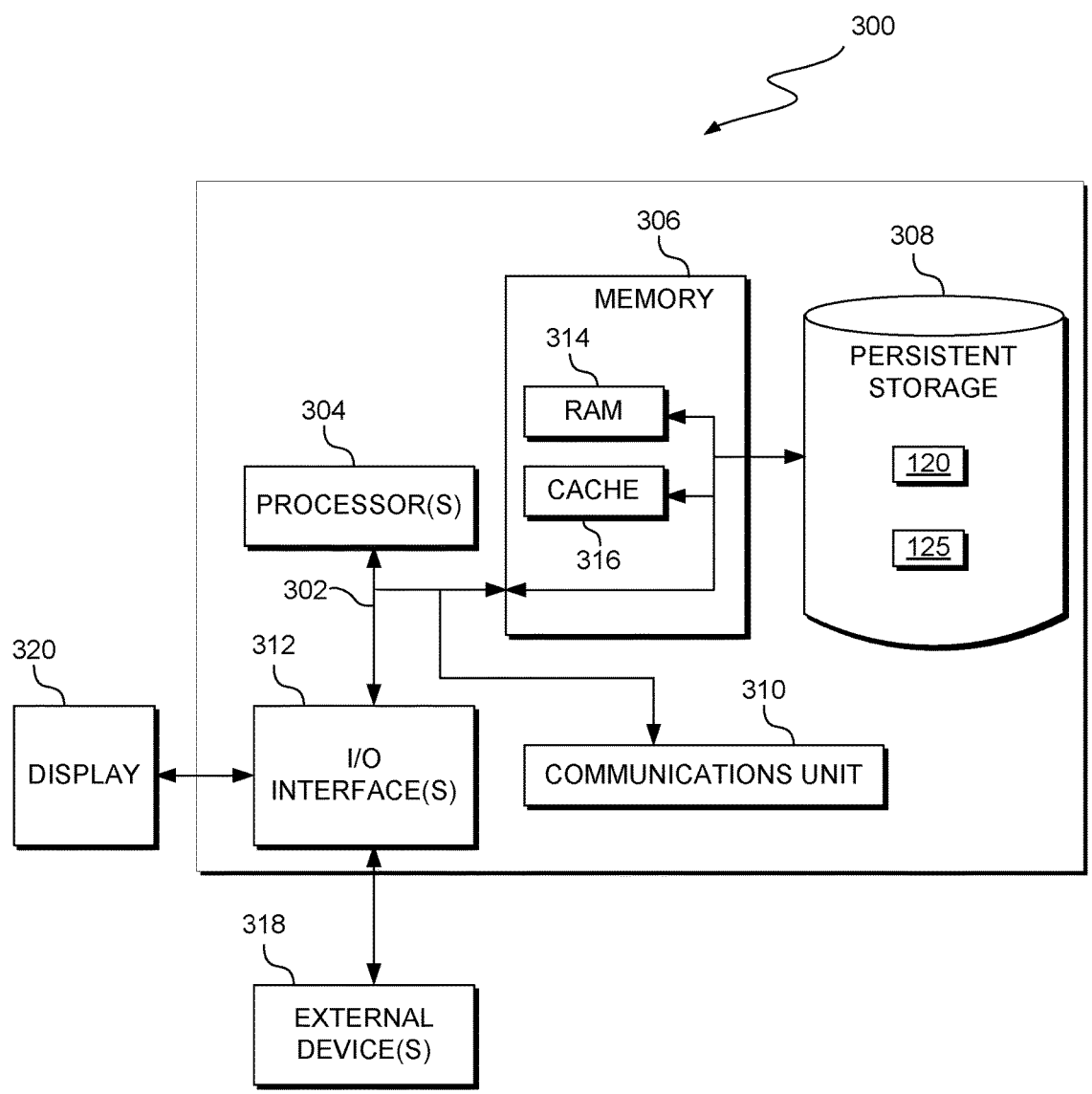
FIG. 3 depicts a block diagram of components of the computing device executing the overlay program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Overlay program 120 and media data 125 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Overlay program 120 and media data 125 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., overlay program 120 and media data 125, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

FIG. 4 illustrates top down view of an overlay as viewed from the perspectives of two different overlay device 150, denoted overlay device 150A and 150B, in accordance with an exemplary embodiment of the present invention. Note that arrow 405, indicating the direction of overlay device 150A, is pointing in a different direction than arrow 410, which indicates the direction of overlay device 150B. FIG. 4 illustrates area 420 that includes foreground objects and content. FIG. 4 illustrates area 430 that includes objects and content that are in the field of focus for imaging device 140. FIG. 4 illustrates area 440 that includes background objects and content. FIG. 4 illustrates area 450, included in area 440, that that has a light level that exceeds one or more thresholds. FIG. 4 also shows, dashed ring 460, which is a boundary line that is included in the overlay image to demarcate a zone surrounding the field of vision of imaging device 140 (shown as areas 420, 430, 440, and 450). In this example, boundary line indicates to users of overlay device 150 that they are not allowed to enter the area contained within dashed ring 460. Note that while the top-down view of FIG. 4 is shown as two dimensional, in various embodiments, the overlay can include both two dimensional and three dimensional structures. In some embodiments, these structures may be shown as having various colors and shades. In some embodiments, various overlay structures may be shown using a variety of patterned lines. Note that in FIG. 4, the objects and events being captured by imaging device 140 are not shown as being inside of the field of vision of imaging device 140 (shown as areas 420, 430, 440, and 450). However, this is for simplicity and ease of understanding of the figures, such objects and events being captured by imaging device 140 are to be understood as existing even though they are not shown. Further note that the overlay of the field of vision of imaging device 140 (shown as areas 420, 430, 440, and 450) is displayed differently by overlay device 150A when compared to the overlay displayed by overlay device 150B. As described in the discussion of FIGS. 1 and 2, such differences between these two displayed overlay images results from the differences in perspective, location, and orientation of overlay device 150A when compared to overlay device 150B.

Figure 5:
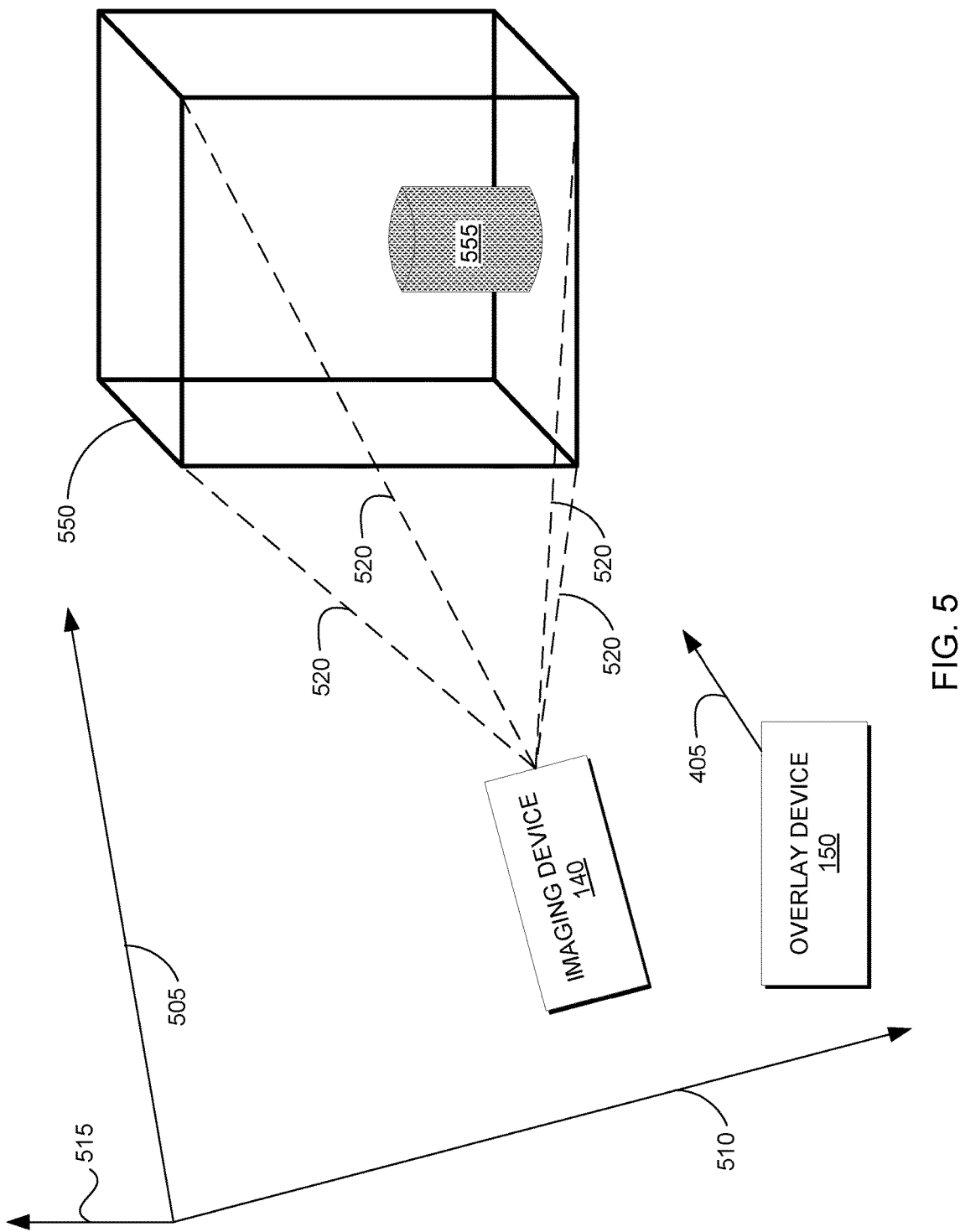
FIG. 5 illustrates perspective view of a three dimensional overlay as viewed from the perspectives of an overlay device, in accordance with an exemplary embodiment of the present invention.

FIG. 5 illustrates perspective view of a three dimensional overlay, indicated by wireframe hexahedron 550 and dashed lines 520, as viewed from the perspectives of overlay device 150, in accordance with an exemplary embodiment of the present invention. In general the four dashed lines 520 and one face of wireframe hexahedron 550 form a pyramid structure with an apex that extends to imaging device 140. In this embodiment, wireframe hexahedron 550 includes a cylinder 555 within its confines. As such, wireframe hexahedron 550 indicates that cylinder 555 is included in the field of focus for imaging device 140.

Similar to the discussion regarding FIG. 4. In one embodiment, wireframe hexahedron 550 and dashed lines 520 are displayed to a user of overlay device 150. Note that in FIG. 5, a three coordinate system is provided by arrows 505, 510, and 515. In one embodiment, such coordinate data is included as part of media data 125. In this example and embodiment, both overlay program 120 and overlay device 150 use this information to determine and orient the view of wireframe hexahedron 550 and dashed lines 520 for the user of overlay device 150. In one such embodiment, overlay program 120 determines the size, shape and position of wireframe hexahedron 550 relative to coordinate data and includes at least a part of this information in data sent to overlay device 150. In one embodiment, overlay device 150 uses that same data, along with the position and orientation of overlay device 150, to orient the overlay image of wireframe hexahedron 550 and dashed lines 520 in the view of user of overlay device 150. As such, as the user of overlay device 150 moves about, wireframe hexahedron 550 and dashed lines 520 are displayed to the user as being an object with a fixed position and orientation. Note that the size, shape and position of such objects changes according to data sent by imaging device 140. For example, if the focus of imaging device 140 changes, then the location, size, and shape, of wireframe hexahedron 550 and dashed lines 520 alter accordingly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method for generating an augmented reality overlay for camera field of vision based on a perspective of a display device, the method comprising:
   generating, by one or more processors, a shape as a visual guide in an overlay image, wherein the shape indicates what tangible content is included within a field of view of an imaging device based at least on an orientation of the imaging device at a first location;
   generating, by the one or more processors, a modified overlay image by modification of one or both of a size and an orientation of the shape in the overlay image based, at least in part, on differences between (i) a second location and an orientation of an image display device relative to (ii) the first location and the orientation of the imaging device, wherein the image display device and the imaging device are at different locations; and
   displaying, by the one or more processors, the modified overlay image using the image display device.

2. The method of claim 1, wherein the image display device is worn by a user such that the vision of that user includes the modified overlay image.

3. The method of claim 1, the method further comprising:
   determining, by the one or more processors, the first location of the imaging device based, at least in part, on a data from at least one of an indoor positioning system, a global positioning system, and one or more orientation sensors, wherein a measure of a depth of field of the field of view of the imaging device is based, at least in part, on the data.

4. The method of claim 1, the method further comprising:
   identifying, by the one or more processors, a known object included in an image data received from the imaging device; and
   determining, by the one or more processors, the first location of the imaging device based, at least in part, on a comparison between a known orientation and known size of the known object and an apparent orientation and apparent size of the known object as included in the image data.

5. The method of claim 1, wherein the modified overlay image includes at least one of a) three dimensional shape with one or more edges that outline at least a portion of the field of view of the imaging device, b) a first content that is viewable by the imaging device, c) a second content as seen through an obstacle, d) a depth view of the imaging device, and e) a visual identifier that indicates an object that is obstructed from the field of view of the imaging device.

6. The method of claim 1, the method comprising:
   determining, by the one or more processors, that a type of criterion has been met that dictate that the overlay image is to be updated; and
   updating, by the one or more processors, the overlay image based, at least in part, on the type of criterion.

7. The method of claim 6, wherein the type of criterion includes at least one of a) passage of a predetermined time period, b) a change in one or both of the second location of the image display device and the first location of the imaging device, c) a change in a content being captured by the imaging device, and d) a change in one or more settings of the imaging device.

8. A computer program product for generating an augmented reality overlay for camera field of vision based on a perspective of a display device, the computer program product comprising:
one or more computer-readable storage media and program instructions stored on the one or more computer-readable storage media for execution by one or more processors, the program instructions comprising:
program instructions to generate a shape as a visual guide in an overlay image, wherein the shape indicates what tangible content is included within a field of view of an imaging device based at least on an orientation of the imaging device at a first location;
program instructions to generate a modified overlay image by modification of one or both of a size and an orientation of the shape in the overlay image based, at least in part, on differences between (i) a second location and an orientation of an image display device relative to (ii) the first location and the orientation of the imaging device, wherein the image display device and the imaging device are at different locations; and
program instructions to display the modified overlay image using the image display device.

9. The computer program product of claim 8, wherein the image display device is worn by a user such that the vision of that user includes the modified overlay image.

10. The computer program product of claim 8, the program instructions further comprising:
program instructions to determine the first location of the imaging device based, at least in part, on a data from at least one of an indoor positioning system, a global positioning system, and one or more orientation sensors, wherein a measure of a depth of field of the field of view of the imaging device is based, at least in part, on the data.

11. The computer program product of claim 8, the program instructions further comprising:
program instructions to identify a known object included in an image data received from the imaging device; and
program instructions to determine the first location of the imaging device based, at least in part, on a comparison between a known orientation and known size of the known object and an apparent orientation and apparent size of the known object as included in the image data.

12. The computer program product of claim 8, wherein the modified overlay image includes at least one of a) three dimensional shape with one or more edges that outline at least a portion of the field of view of the imaging device, b) a first content that is viewable by the imaging device, c) a second content as seen through an obstacle, d) a depth view of the imaging device, and e) a visual identifier that indicates an object that is obstructed from the field of view of the imaging device.

13. The computer program product of claim 8, the program instructions comprising:
program instructions to determine that a type of criterion has been met that dictates that the overlay image is to be updated; and
program instructions to update the overlay image based, at least in part, on the type of criterion.

14. The computer program product of claim 13, wherein the type of criterion includes at least one of a) passage of a predetermined time period, b) a change in one or both of the second location of the image display device and the first location of the imaging device, c) a change in a content being captured by the imaging device, and d) a change in one or more settings of the imaging device.

15. A computer system for generating an augmented reality overlay for camera field of vision based on a perspective of a display device, the computer system comprising:
one or more computer processors;
one or more computer readable storage medium;
program instructions stored on the computer readable storage medium for execution by at least one of the one or more processors, the program instructions comprising:
program instructions to generate a shape as a visual guide in an overlay image, wherein the shape indicates what tangible content is included within a field of view of an imaging device based at least on an orientation of the imaging device at a first location;
program instructions to generate a modified overlay image by modification of one or both of a size and an orientation of the shape in the overlay image based, at least in part, on differences between (i) a second location and an orientation of an image display device relative to (ii) the first location and the orientation of the imaging device, wherein the image display device and the imaging device are at different locations; and
program instructions to display the modified overlay image using the image display device.

16. The computer system of claim 15, wherein the image display device is worn by a user such that the vision of that user includes the modified overlay image.

17. The computer system of claim 15, the program instructions further comprising:
program instructions to determine the first location of the imaging device based, at least in part, on a data from at least one of an indoor positioning system, a global positioning system, and one or more orientation sensors, wherein a measure of a depth of field of the field of view of the imaging device is based, at least in part, on the data.

18. The computer system of claim 15, the program instructions further comprising:
program instructions to identify a known object included in an image data received from the imaging device; and
program instructions to determine the first location of the imaging device based, at least in part, on a comparison between a known orientation and known size of the known object and an apparent orientation and apparent size of the known object as included in the image data.

19. The computer system of claim 15, wherein the modified overlay image includes at least one of a) three dimensional shape with one or more edges that outline at least a portion of the field of view of the imaging device, b) a first content that is viewable by the imaging device, c) a second content as seen through an obstacle, d) a depth view of the imaging device, and e) a visual identifier that indicates an object that is obstructed from the field of view of the imaging device.

20. The computer system of claim 15, the program instructions comprising:
program instructions to determine that a type of criterion has been met that dictates that the overlay image is to be updated; and program instructions to update the overlay image based, at least in part, on the type of criterion.

* * * * *